Figure 1:
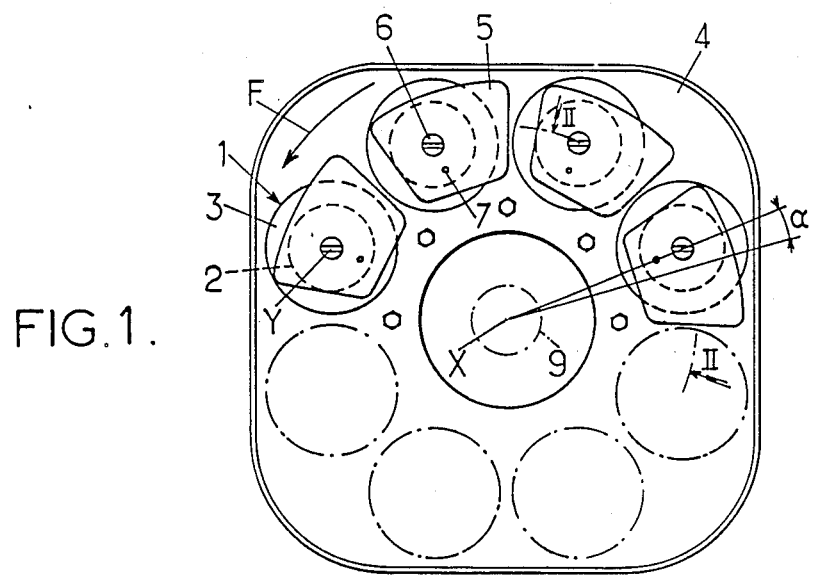

United States Patent [19]

Marandet et al.

[11] Patent Number: 4,668,886
[45] Date of Patent: May 26, 1987

[54] EDDY CURRENT RETARDERS

[75] Inventors: Andre J. P. Marandet, St. Gratien; Gerard R. W. Dancygier, Paris, both of France

[73] Assignee: 501 Labavia - S.G.E., France

[21] Appl. No.: 804,770

[22] Filed: Dec. 5, 1985

[30] Foreign Application Priority Data

Dec. 5, 1984 [FR] France ................................. 8418549

[51] Int. Cl.$^4$ .......................................... H02K 49/04
[52] U.S. Cl. ...................................... 310/93; 188/164; 310/105
[58] Field of Search ............... 188/267, 159, 160, 161, 188/162, 164, 165; 192/84 PM, 84 E; 310/77, 93, 193, 103, 105

[56] References Cited

U.S. PATENT DOCUMENTS

| 2,240,652 | 5/1941 | Jenkins | 310/193 X |
| 2,640,941 | 6/1953 | Winther | 310/93 |
| 2,957,093 | 10/1960 | Bessiere | 310/93 |
| 3,391,292 | 7/1968 | Elizalde | 188/161 X |

FOREIGN PATENT DOCUMENTS

| 2306112 | 10/1976 | France | 188/165 |
| 778708 | 7/1957 | United Kingdom | 310/93 |

Primary Examiner—Duane A. Reger
Attorney, Agent, or Firm—Larson and Taylor

[57] ABSTRACT

In an eddy current retarder, more especially for vehicles, each enlarged pole shoe (5) is shifted circumferentially rearwardly, with respect to the axis (Y) of the corresponding magnetic core (2), i.e. in the direction opposite that (F) of the rotation of the rotor.

6 Claims, 5 Drawing Figures

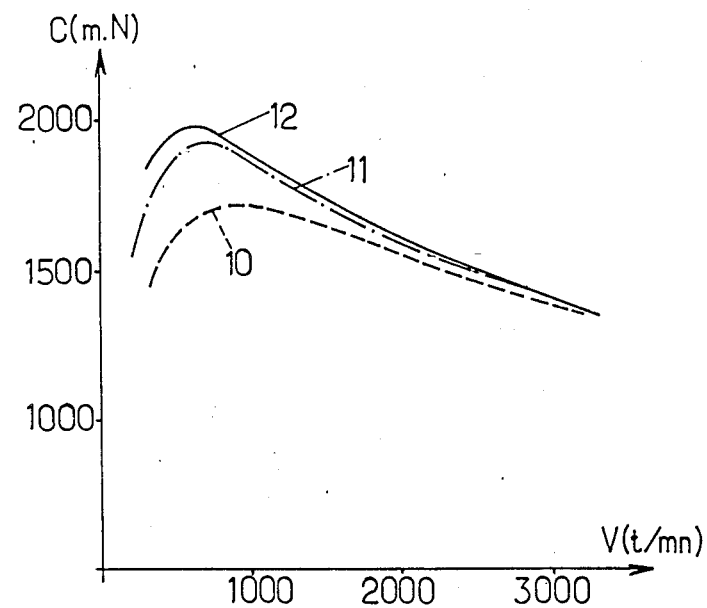
FIG.4.
FIG.5.
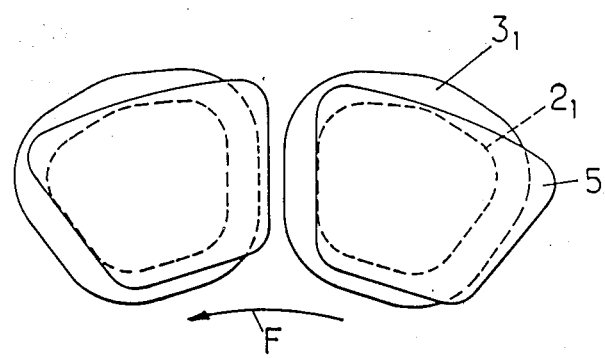

EDDY CURRENT RETARDERS

The invention relates to electric retarders for slowing down a rotating shaft and comprising:

on the one hand, an electromagnetic inductor stator integral with the shaft support and comprising at least one discontinuous ring of projecting electric poles with alternate polarities, and, on the other hand, a rotor armature disk made from a magnetic material integral with the shaft and mounted coaxially with the ring of poles so as to travel axially facing this ring from which it is only separated by an annular air gap of small thickness.

It relates more particularly, among these retarders, to those in which the poles forming the discontinuous ring are formed by cylindrical or prismatic cores made from a magnetic material surrounded by electric wire windings, which coils extend parallel to the axis of the shaft and end, at the level of the air gap, in widened end portions, which are generally formed by plates fixed to said cores, said ends being designated hereafter by the expression "enlarged pole shoes".

It relates more particularly still, but not exclusively, among these retarders to those which equip vehicles and for which the rotor armature is integral with the vehicle transmission shaft to be slowed down, the inductor being integral with the chassis which supports the retarder and the shaft.

In what follows, the following definitions will be used:

"circumferential direction", the direction of a circle centered on the axis of the retarder, the word "circumferentially" meaning "in a circumferential direction", "circumferential section" of an enlarged pole shoe, the section of this shoe through the cylindrical surface of revolution having for axis that of the apparatus, passing through the center of the endmost surface of said shoe and normal to this surface, "input horn" and "output horn" of an enlarged pole shoe, respectively the "upstream" or "rear edge" and the "downstream" or "front" edge of this shoe considered circumferentially with respect to the relative travel direction of the armature disk, in this sense that when passing in front of each enlarged pole shoe, each point of this disk moves from the input horn to the output horn of said shoe.

In known embodiments of retarders of the above kind, the circumferential section of each enlarged pole shoe has a symmetrical contour with respect to the plane passing through the axis of the retarder and through the axis of the corresponding core.

The aim of the invention is especially to increase the torques due to the creation of the eddy currents in the retarders considered for a given weight and size of these apparatus.

To this end, the retarders in question of the invention are characterized in that the circumferential section of each enlarged pole shoe is disymmetrical with respect to the plane passing through the axis of the retarder and through the axis of the corresponding core, its input horn extending further from this plane than its output horn.

In preferred embodiments, recourse is further had to one and/or the other of the following arrangements:

each enlarged pole shoe has, in an end view considered parallel to the axis of the retarder, the general form of an isosceles trapezium, with preferably rounded angles, whose center is offset circumferentially with respect to the axis of the corresponding core in the direction opposite that of rotation of the disk, in a retarder according to the preceding paragraph, the cross section of each core has the general form of an isosceles trapezium with preferably rounded angles, the thickness of each enlarged pole shoe considered perpendicularly to its endmost surface is constant over the whole extent thereof, the thickness of each enlarged pole shoe considered perpendicularly to its endmost surface is relatively small in that the ratio between this thickness and the outer diameter of the disk is between 1/50 and 1/30, the surface defining the edge of the output horn of each enlarged pole shoe is perpendicular to the endmost surface of this shoe and tangent to the lateral surface of the corresponding core, the input horn of each enlarged pole shoe extends circumferentially at least as far as the lateral surface of the winding which surrounds the core ended by the adjacent enlarged pole shoe.

The invention comprises, apart from these main arrangements, certain other arrangements which are preferably used at the same time and which will be more explicitly discussed hereafter.

In what follows, embodiments of the invention will be described with reference to the accompanying drawings in a way which is of course in no wise limitative.

Figure 2:
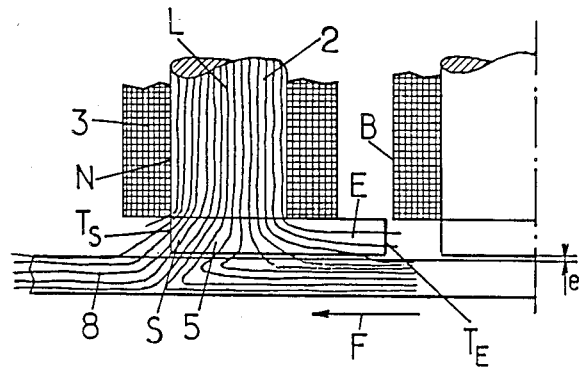
Figure 3:
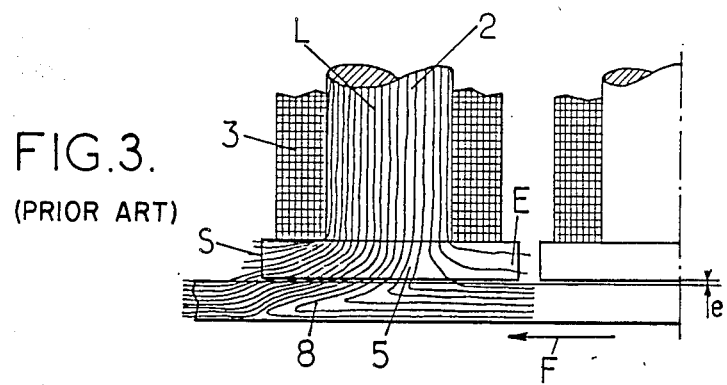

FIG. 1, of these drawings, shows a partial end view of the inductor stator of an eddy current retarder for a vehicle in accordance with the invention, FIG. 2 shows in partial "circumferential" section through II—II of FIG. 1, enlarged and developed, the whole of this stator and of a part of the armature rotor of said retarder, said section showing the distribution of the magnetic field in the magnetic parts, FIG. 3 shows by way of comparison a section of a known stator-rotor assembly in a view similar to that of FIG. 2, i.e. showing the distribution of the magnetic field in the magnetic parts, which distribution was not known before the invention, FIG. 4 is a graph for illustrating the advantage of the invention, and FIG. 5 shows schematically an end view of two poles of an eddy current retarder constructed in accordance with a variant of the invention.

In a way known per se, the stator of the retarder comprises in each case a ring of identical electromagnets 1, even in number (8 in the present case) spaced apart evenly about the axis X of the retarder and each formed of a cylindrical or prismatic core 2 with axis Y parallel to X and with an electric wire winding 3 surrounding this core.

Each core 2 is mounted on a common support 4 which is for example in the form of at least a cup and which is itself mounted on the chassis of the vehicle or else on the casing of the rear axle or of the gearbox of this vehicle.

Each winding 3 is held on its core 2 by screwing a projecting plate 5 on the end of this core, more especially using a single screw 6, this plate being secured angularly against movement about the screw by cooperation of an eccentric pin 7 integral with the plate with a complementary recess of the core.

The outer faces of the plates 5 extend in the same plane perpendicular to axis X and thus form a flat discontinuous ring.

The windings are connected electrically by means of appropriate control and connection means to a DC supply source and their connections to this source are provided so that the successive plates 5 of the ring which has just been described define electric poles of alternately positive and negative polarities: plates 5 form "enlarged portions" for these poles and are often called "enlarged pole shoes".

Also in a way known per se, the rotor of the retarder comprises at least one continuous disk 8 (FIGS. 2 and 3) secured angularly to a portion 9 (FIG. 1) of the transmission shaft of the vehicle so as to travel opposite the stator ring, this disk and this ring being separated from each other by an annular gap e (FIGS. 2 and 3).

The thickness of this gap e or "air gap" is small for example of the order of 1 to 2 mm.

The arrow F in the Figures shows the direction of movement of the rotor disk 8 with respect to the facing stator ring.

The cores 2, plates 5 and disk 8 are all made from a ferro magnetic material so as to form, for the magnetic flux generated by the electric energization of the windings 3, magnetic circuits which are closed while passing each one twice across the air gap e.

It is this flux which induces in disk 8, during rotation of this disk, eddy currents which oppose such rotation, which results in braking the shaft of the vehicle.

In known embodiments of electric retarders of the above described type, the "circumferential" section in the above defined meaning of each plate or enlarged pole shoe 5 is symmetrical with respect to the plane passing through the axis X of the retarder and through the axis Y of the corresponding magnetic core 2.

In other words, the input E and output S horns of each enlarged pole shoe have circumferential sections identical to each other as can be seen in FIG. 3.

In this case, when the retarder is energized, the distributions of the magnetic flux in these two horns E and S are identical when the retarder is stopped.

Up to the present time it was not known what became of these distributions when the armature 8 began to rotate, because of the disturbances due to the armature reaction.

It should be recalled here that the armature reaction phenomenon has been studied for a long time for dynamo-electric machines with collector and wound armature.

In such a case, the turns of the armature are perfectly defined in number, in dimension and in orientation and the same goes for the direction and intensity of the current in each of them: it is therefore easy to calculate the armature reaction flux corresponding to each of these turns and to determine the overall influence of these fluxes on the local saturations of the magnetic circuit.

To overcome such saturations, it has already been proposed to modify the circumferential lengths of the pole horns of some of these machines, in directions which differ depending on whether these machines are motors or generators (see U.S. Pat. No. 2,240,652).

The situation is quite different for eddy current machines.

In fact, these currents whose swirling paths close on themselves to form a short circuit are difficult to identify, to locate and to measure and before the invention no one had succeeded in defining them sufficiently so as to deduce therefrom usable information in so far as the saturation of the pole horns is concerned during operation of the retarder.

Using modern computerized calculation methods, the applicant has succeeded in mastering these questions and even in displaying the lines of the magnetic field in the mass of the magnetic parts when the retarder is operating.

It has thus been discovered that, when the armature 8 rotates in the direction of arrow F, if we consider a symmetrical construction of each pole as in known retarders (FIG. 3), the magnetic flux is more concentrated in the output horn S than in the input horn E: this is what can be seen in FIG. 3, where the field lines L representing the magnetic flux are all the closer together the higher the local magnetic induction.

This concentration results in a more rapid saturation of the output horn S than of the input horn E, when the electric supply to the winding 3 corresponding to the enlarged pole shoe 5 considered is progressively increased.

For delaying the time when saturation reaches the output horn S, when the electric power supply is increased as indicated, in accordance with the invention, the enlarged pole shoe 5 is shifted circumferentially "rearwardly", i.e. in the direction opposite the direction of rotation F of disk 8.

The applicant has discovered that, in this case, the magnetic field is distributed more homogeneously over the whole of the volume of each enlarged pole shoe the output horn being as it were relieved of its excess induction to the benefit of the input horn, which was deficient before in this respect.

This is what is symbolized by the distribution of the field lines L in FIG. 2, which was established by adopting exactly the same operating assumptions as for FIG. 3, the only difference made to the construction of FIG. 1 residing in the circumferential rearward shift of the enlarged pole shoes.

In particular, all the dimensions of these enlarged shoes have been kept in full.

The angular value $\alpha$ of the above circumferential shift is preferably between A/25 and A/7 if we designate by A the angular pole pitch, i.e. the angle reckoned about the axis X of the apparatus which separates the planes passing through this axis and respectively through the axes Y of two successive poles: in the case illustrated where the number of poles is equal to 8, this angle $\alpha$ is preferably between 2° and 7°.

If we further designate by polar arc the angle reckoned about the axis X in which an enlarged pole shoe is inscribed, the ratio between this polar arc and the angular polar pitch defined above is preferably between 0.65 and 0.90: this ratio is of the order of 0.80 in the illustrated embodiment.

In this embodiment in addition:

the thickness of each enlarged pole shoe 5, considered in an axial direction, remains constant over the whole of its extent, each plate forming an enlarged pole shoe 5 has the general form of an isosceles trapezium with rounded angles, the surface which defines the edge $T_S$, of the output horn S of each enlarged shoe, which is situated circumferentially opposite the edge $T_E$ of the input horn of the adjacent enlarged shoe, is tangent to the lateral surface N of the core 2 ended by the enlarged shoe considered, at least at the level of the cylindrical surface of revolution having for axis the axis X of the retarder and containing the axes Y of cores 2, the surface which defines the edge $T_E$ of the input horn of each enlarged shoe is tangent to the lateral surface B of the winding or coil 3 surrounding the core ended by the adjacent enlarged shoe, the flat mutually facing edges $T_S$ and $T_E$ of the successive enlarged pole shoes form therebetween two by two a small angle, each of them being defined by a plane passing through the axis X of the retarder: but these edges may also be parallel two by two.

Experience shows that, quite surprisingly, in retarders whose enlarged pole shoes are circumferentially "shifted" rearwardly in the way indicated above, the retarding torques generated are very much greater than those generated by identical retarders but whose enlarged pole shoes are centered on the corresponding cores.

This improvement is clearly shown in the graph of FIG. 4, in which there are plotted:

as abscissa, the rotational speeds V of the rotor of the retarder in rpm, and as ordinates, the torques C generated by this retarder on the shaft in meters.Newtons.

The curve 10 of this FIG. 4 corresponds to a retarder with conventional enlarged pole shoes, i.e. mounted and centered on the corresponding cores, in accordance with FIG. 3.

Curve 11 corresponds to the same retarder whose enlarged pole shoes are shifted circumferentially rearwardly with respect to the corresponding cores, i.e. in the direction opposite the direction of rotation (F) of the disk, in accordance with FIGS. 1 and 2.

It can be seen that the increase of the retarding torque obtained, all other things being equal, by the "rearward" shift of the enlarged pole shoes is considerable since it may reach more than 15% when cold for certain rotational speeds of the rotor, in particular for relatively low speeds, of the order of 500 to 1000 rpm: for higher speeds, the magnetic circuits are not usually saturated so that the gain brought by the invention is less obvious.

In each of the cases mentioned above with reference to FIGS. 1 to 3, each magnetic core 2 was defined by a cylindrical surface of revolution with axis Y.

Under these conditions, modification of the distribution of the magnetic field symbolized by the lines L in FIGS. 2 and 3 only theoretically concerns the very thin portion of the volume of each enlarged pole shoe which extends along the cylindrical surface corresponding to the sections of said Figures.

To increase the volume of each enlarged pole shoe for which the distribution of the magnetic field has improved in a way described above by the simple "rearward" shift of the enlarged pole shoes, each magnetic core may be given the form of a prism or cylinder whose cross section is similar to that of the enlarged shoe which terminates it or which at least approximates thereto.

In the case of FIG. 5, this cross section of each core is defined by a trapezium with rounded angles $2_1$ ressembling the general shape of the enlarged shoes 5 mentioned above. In such a case, the electric winding has the general shape of a prismatic sleeve $3_1$ with trapezoidal section of a substantially constant thickness.

Experience shows that, with a retarder thus improved, the retarding torque is further improved, as is illustrated by curve 12 in FIG. 4: in this case, the increasing torque, with respect to the previously known retarders (curve 10), reaches and even exceeds 20% for some values of the speed.

As can be seen in FIG. 2, the rearward shift of the invention results in the suppression of a very considerable portion of the very quickly saturated output horn S of previously known constructions: since the input horn E is developed correspondingly to the point of existing almost exclusively and since this input horn is less sensitive to magnetic saturation, it is possible to make it thinner, as well as the whole of the enlarged pole shoe, with respect to known constructions for given performances, which reduces the weight and the size.

Thus the ratio between the thickness of the enlarged pole shoe and the outer diameter of the annular armature of the retarder, which ratio is generally greater than 1/30, may drop below 1/35 and even be as small as 1/50.

Following which, and whatever the embodiment adopted, an extremely simple and efficient means is provided for increasing the power to mass torque of an electric retarder since it is sufficient to shift its enlarged pole shoes slightly "rearwardly".

As is evident, and as it follows moreover already from what has gone before, the invention is in no wise limited to those of its modes of application and embodiments which have been more especially considered; it embraces, on the contrary, all variants thereof particularly:

those in which the inductor stator of the retarder comprises two rings of poles of alternate polarities defining two flat rings of enlarged pole shoes, each of these two flat rings being associated with a rotor armature disk and the two disks, interlocked together, then axially surrounding the inductor, those in which the enlarged pole shoes form a single block with the magnetic material cores which they extend, being for example integrally molded with these cores instead of being formed by independent plates fixed to said cores, those in which the enlarged pole shoes have a general shape other than that of an isosceles trapezium with rounded corners, the corners of this trapezium possibly not being rounded and the trapezium itself possibly being other than isosceles, for example rectangular, or even slightly curved about the axis of the retarder, those in which the eddy current retarder considered is not fitted to a vehicle but to another machine comprising a rotary shaft to be slowed down, such as a lifting or drilling apparatus.

We claim:

1. In an electric retarder for slowing down a rotary shaft mounted in a support, said retarder having a central axis and comprising an electromagnetic inductor stator which may be secured to the support for the shaft, said stator comprising at least on discontinuous ring of projecting electric poles of alternate polarities, each pole comprising a core made from a magnetic material and surrounded by an electrical winding, the longitudinal axis of each said core extending parallel to the central axis of the retarder and an enlarged pole shoe located at one end of each of said cores and including an input horn extending a direction opposite to the direction of rotation of the shaft and an output horn extending in the direction of rotation of the shaft, said retarder further comprising a rotor armature disk made from a magnetic material which may be fixed to the shaft and mounted coaxially with respect to the ring of poles and positioned opposite the enlarged pole shoes so as to be separated therefrom by an annular air gap of small thickness, the improvement wherein the shape of each pole shoe is such that a section taken through a pole shoe in circumferential direction with the central axis of the retarder as a center is asymmetrical with respect to a plane passing through the central axis of the retarder and through the longitudinal axis of the corresponding core such that the input horn of the pole shoe extends further from this plane than the output horn of that pole shoe.

2. The electric retarder according to claim 1, wherein each enlarged pole shoe has, in an end view taken in a direction parallel to the axis of the retarder, the general shape of an isosceles trapezoid the center of which is shifted in said circumferential direction, with respect to the longitudinal axis of the corresponding core, in the direction opposite to the direction of the rotation of the armature disk.

3. The electric retarder according to claim 2, characterized in that the cross section of each core has the general form of an isosceles trapezoid with rounded corners.

4. The electric retarder according to claim 1, wherein the thickness of each enlarged pole shoe in a direction parallel to the longitudinal axis of the core is constant throughout.

5. The electric retarder according to claim 1, wherein a lateral edge of the output horn of each enlarged pole shoe is aligned with a lateral edge.

6. The electric retarder according to claim 2, wherein the corners of said isosceles trapezoid are rounded.

* * * * *

UNITED STATES PATENT AND TRADEMARK OFFICE
CERTIFICATE OF CORRECTION

PATENT NO. : 4,668,886

DATED : May 26, 1987

INVENTOR(S) : Andre J.P. Marandet, St. Gratien; Gerard R.W. Dancygier, Paris, both of France It is certified that error appears in the above-identified patent and that said Letters Patent are hereby corrected as shown below:

On the Title Page, Item [73] should read:

Assignee: Labavia - S.G.E.

Signed and Sealed this

Twenty-second Day of March, 1988

Attest:

DONALD J. QUIGG

Attesting Officer

Commissioner of Patents and Trademarks